(12) United States Patent
Igarashi (10) Patent No.: US 11,680,808 B2
(45) Date of Patent: Jun. 20, 2023

(54) MAP SELECTION DEVICE, STORAGE MEDIUM STORING COMPUTER PROGRAM FOR MAP SELECTION AND MAP SELECTION METHOD

(71) Applicant: TOYOTA JIDOSHA KABUSHIKI KAISHA, Toyota (JP)

(72) Inventor: Ryo Igarashi, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/243,680

(22) Filed: Apr. 29, 2021

(65) Prior Publication Data

US 2021/0364306 A1 Nov. 25, 2021

(30) Foreign Application Priority Data

May 19, 2020 (JP) .............................. JP2020-087449

(51) Int. Cl.
  *G01C 21/00* (2006.01)
  *G01C 21/34* (2006.01)
  *G01C 21/36* (2006.01)
(52) U.S. Cl.
  CPC ....... *G01C 21/3461* (2013.01); *G01C 21/367* (2013.01); *G01C 21/3874* (2020.08)
(58) Field of Classification Search
  CPC .............. G01C 21/3461; G01C 21/367; G01C 21/3874
  See application file for complete search history.

(56) References Cited

U.S. PATENT DOCUMENTS

| | | | |
|---|---|---|---|
| 10,197,405 B2 * | 2/2019 | Sato ...................... | G05D 1/0088 |
| 10,260,898 B2 * | 4/2019 | McNew ............. | G01C 21/3492 |
| 10,324,463 B1 * | 6/2019 | Konrardy ............. | G05D 1/0278 |
| 11,255,681 B2 * | 2/2022 | Sakaguchi ........... | G05D 1/0214 |
| 2016/0229414 A1 | 8/2016 | Desnoyer et al. | |
| 2017/0227971 A1 * | 8/2017 | Shimotani .......... | G01C 21/3461 |
| 2018/0066960 A1 * | 3/2018 | Tateishi ............. | G01C 21/3461 |
| 2018/0339714 A1 * | 11/2018 | Smid ..................... | B60W 50/14 |
| 2019/0064826 A1 * | 2/2019 | Matsui ................. | G05D 1/0276 |
| 2020/0110422 A1 * | 4/2020 | Takamatsu ......... | G01C 21/3848 |
| 2021/0407290 A1 * | 12/2021 | Oba ..................... | G05D 1/0223 |

FOREIGN PATENT DOCUMENTS

| | | |
|---|---|---|
| JP | 2016-523755 A | 8/2016 |
| JP | 2017-32421 A | 2/2017 |
| JP | 2019-039831 A | 3/2019 |
| WO | 2016/035199 A1 | 3/2016 |
| WO | 2017/051478 A1 | 3/2017 |

\* cited by examiner

*Primary Examiner* — Redhwan K Mawari
*Assistant Examiner* — Kathleen B Ward
(74) *Attorney, Agent, or Firm* — Oliff PLC (57) ABSTRACT

A map selection device having an acquisition device that acquires a traveling route from the current location of a vehicle to a destination, a storage device that stores multiple maps, and a processor configured to select one or more maps containing a traveling route from among the multiple maps stored in the memory, so as to include the region from the current location on the traveling route to the destination, and, when multiple map candidates exist containing a single zone included in the traveling route, to select a map candidate suitable for automatic control as the map to be utilized for traveling in the zone.

4 Claims, 8 Drawing Sheets

MAP SELECTION DEVICE, STORAGE MEDIUM STORING COMPUTER PROGRAM FOR MAP SELECTION AND MAP SELECTION METHOD

FIELD

The present invention relates to a map selection device, to a storage medium storing a computer program for map selection and a map selection method.

BACKGROUND

High-precision road map data that is to be referred to for automatic control of a vehicle by a vehicle self-driving control system must containing road-related information in order to estimate the current location of the vehicle. Maps have positional information for roads and for road features including lane marking lines, signs and structures around the roads.

The control level for automatic control that can be carried out by a vehicle is determined based on the hardware of the vehicle and on information in the map. The same vehicle may even have a different control level for automatic control that can be carried out, depending on the map being used for traveling. A higher control level for automatic control of the vehicle means a greater amount of automatic control by the vehicle, and consequently a lower amount of control by the driver, thereby reducing burden on the driver.

The control level for automatic control of a vehicle can be classified on a scale of 1 to 5, for example. On level 1, operation of a single function for the vehicle is controlled, e.g., only one operation in either the left-right direction or front-rear direction of the vehicle is controlled. On level 2, operation of a combination of multiple functions for the vehicle is controlled, e.g., operations in the left-right direction and front-rear direction of the vehicle are controlled simultaneously. On level 3, self-driving of the vehicle is controlled with monitoring by the driver, under specified conditions. On level 4, self-driving of the vehicle is fully controlled, under specified conditions. On level 5, self-driving of the vehicle is fully controlled, unconditionally. The driver is the main operator of the vehicle with the control of levels 1 and 2, and therefore this is generally known as manual operation control. With the control of levels 3 to 5, the self-driving control system of the vehicle is the main operator of the vehicle, and it is therefore generally known as automatic operation control.

The electronic device proposed in Japanese Unexamined Patent Publication No. 2017-32421, for example, uses a single map to display a traveling route as the traveling route toward a destination which requires the least amount of user burden time, utilizing expected traveling time data and a user burden coefficient corresponding to the level of automatic operation control.

SUMMARY

It is anticipated that map vendors will soon be providing a large variety of maps to be used for traveling of vehicles by automatic control. Since the vehicle control level is affected by the location precision for road features in the map, and the types and numbers of road features registered in the map, the control level for automatic control must be set according to the type of map utilized. As a result, when multiple maps are provided for different control levels for the same road zone, it is possible that the burden on the driver while the vehicle is traveling under automatic control may differ depending on the map selected.

It is therefore an object of the present invention to provide a map selection device wherein a map is selected to reduce the burden on the driver while the vehicle is traveling under automatic control, in cases where multiple maps exist containing a single zone within a traveling route.

According to one embodiment of the invention there is provided a map selection device. The map selection device has an acquisition device that acquires a traveling route from the current location of the vehicle to the destination, a storage device that stores multiple maps, and a processor configured to select one or more maps containing a traveling route from among the multiple maps stored in the storage device, so as to include the region from the current location on the traveling route to the destination, and, when multiple map candidates exist containing a single zone within the traveling route, to select a map candidate suitable for automatic control as the map to be utilized for traveling in the zone.

In this map selection device, the processor is preferably configured to select the map to be utilized for traveling in the zone based on evaluation values for evaluation of the suitability of each of the multiple map candidates for automatic control.

The processor in the map selection device is preferably configured to calculate an evaluation value for each of the multiple map candidates containing the single zone included within the traveling route, based on the control level for automatic control which allows traveling of the vehicle using the map candidate.

The processor in the map selection device is also preferably configured to determine the length of the zone of the traveling route contained in each of the one or more maps, for each control level for automatic control corresponding to the one or more selected maps, and to calculate the distance that the vehicle can travel with each of the multiple control levels when it is traveling on the traveling route.

According to another embodiment there is provided a computer-readable non-transitory storage medium which stores a computer program for map selection. This computer program for map selection which causes a processor to input a traveling route from the current location of a vehicle to a destination via an acquisition device and to select one or more maps containing the traveling route from among multiple maps stored in a memory, so as to include the region from the current location on the traveling route to the destination, and when multiple map candidates exist containing a single zone included in the traveling route, to select a map candidate suitable for automatic control as the map to be utilized for traveling in the zone.

According to another embodiment there is provided a map selection method. This map selection method causes a processor: to input a traveling route from the current location of a vehicle to a destination via an acquisition device; and to select one or more maps containing the traveling route from among multiple maps stored in the storage device, so as to include the region from the current location on the traveling route to the destination, and when multiple map candidates exist containing a single zone included in the traveling route, to select a map candidate suitable for automatic control as the map to be utilized for traveling in the zone.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
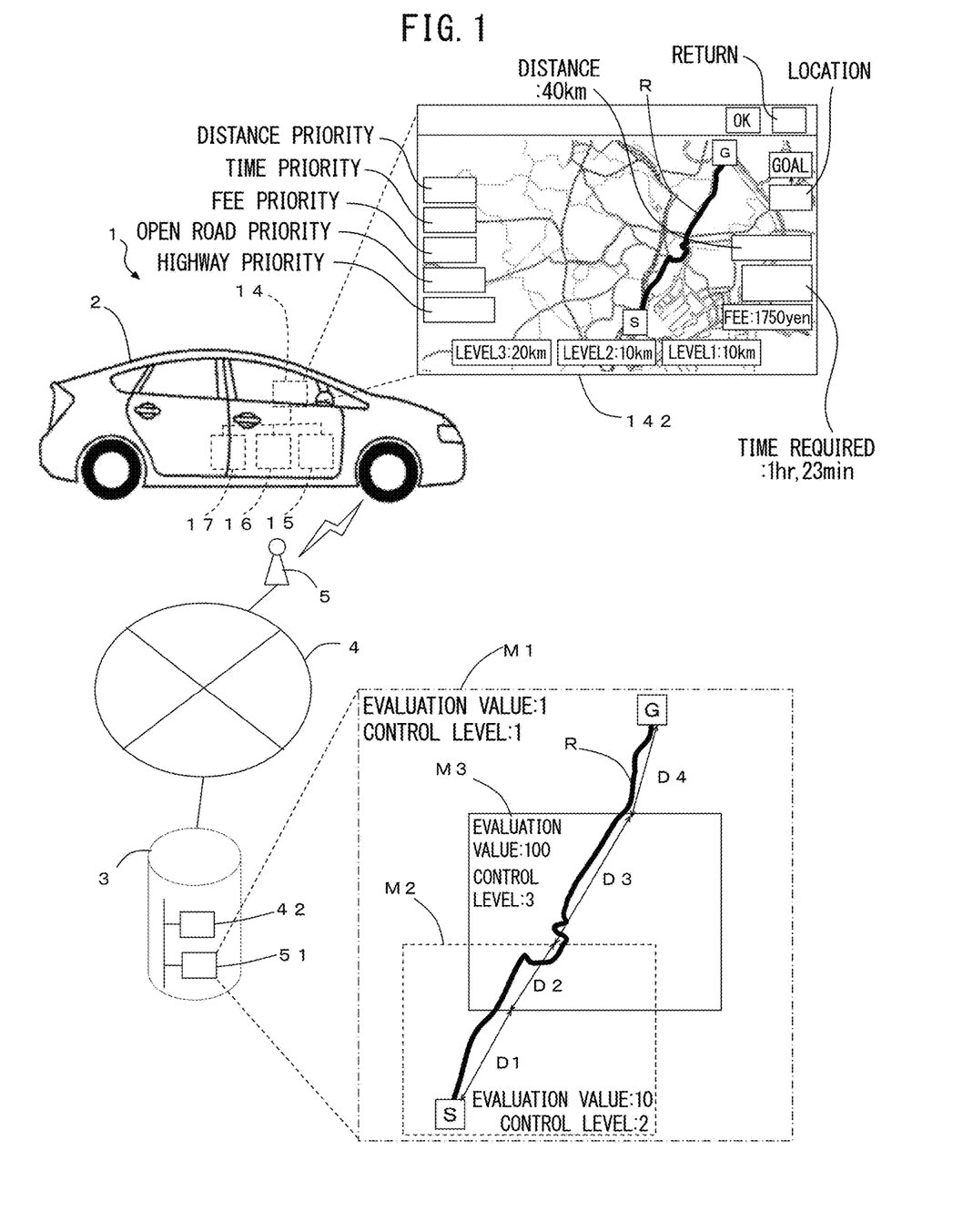
FIG. 1 is a general schematic drawing of a map selecting system in which a map selection device is mounted.

FIG. 1 is a schematic diagram of a map selecting system in which a map selection device is mounted. The map selecting system 1 disclosed herein will now be described in overview with reference to FIG. 1.

The map selecting system 1 of this embodiment comprises at least a vehicle 2 and a server 3. The vehicle 2 includes at least a user interface (UI) 14, a map storing device 15, a vehicle control device 16 and a traveling route selecting device 17. The server 3 includes at least a storage device 42 and a map selecting unit 51. The vehicle and server 3 are mutually connected by accessing a base station 5 that is connected via a communication network 4 and a gateway (not shown). FIG. 1 shows only one vehicle 2 and one base station 5, but the map selecting system 1 may also have multiple vehicles 2 and multiple base stations 5 connected to the communication network 4.

The traveling route selecting device 17 sends to the server 3 a traveling route R from the current location S of the vehicle 2 to the destination G. FIG. 1 shows an example of an image 142 containing a navigation map indicating the traveling route R.

When a traveling route R is acquired, the map selecting unit 51 selects one or more maps containing the traveling route R from among multiple maps stored in the storage device 42, so as to include the region from the current location S of the traveling route R to the destination G. FIG. 1 shows an example of three map candidates M1 to M3 selected so as to include the region from the current location S of the traveling route R to the destination G.

When multiple map candidates exist containing a single zone included within the traveling route R, the map selecting unit 51 selects a map candidate suitable for automatic control as the map to be utilized for traveling in the zone. When the evaluation value for evaluation of suitability for automatic control is in the order map M3 (high) map M2 map M1 (low), the map selecting unit 51 selects map M2 in zone D1, map M3 in zones D2 and D3, and map M1 in zone D4. The map selecting unit 51 sends to the vehicle 2 information relating to the relationship between the traveling route R and zones, and relating to the map selected for each zone.

The traveling route selecting device 17 of the vehicle 2 receives from the server 3 the information relating to the relationship between the traveling route R and zones D1 to D4, and to maps M1 to M3 selected for each zone, and stores the information in the map storing device 15. The traveling route selecting device 17 uses the UI 14 to display an image 142 containing the navigation map showing the traveling route R. The vehicle control device 16 of the vehicle 2 controls each zone, based on the information relating to the relationship between the traveling route R and zones D1 to D4, and the maps M1 to M3 selected for each zone, which are stored in the map storing device 15, so that the vehicle 2 travels at a control level for automatic control which allows travel. Since the vehicle 2 can travel through each zone of the traveling route R using the map with the highest evaluation value for automatic control while traveling at a control level for automatic control corresponding to the map, the map selecting system 1 can further reduce burden on the driver while the vehicle 2 is traveling under automatic control.

The construction of the vehicle 2 and server 3 and the detailed processing flow at the vehicle 2 and server 3 for the map selecting system 1 will be explained below. Incidentally, while more than one vehicle 2 may be included in the map selecting system 1, since each vehicle 2 has the same construction and conducts the same processing for map selection processing, the following explanation will assume only a single vehicle 2.

Figure 2:
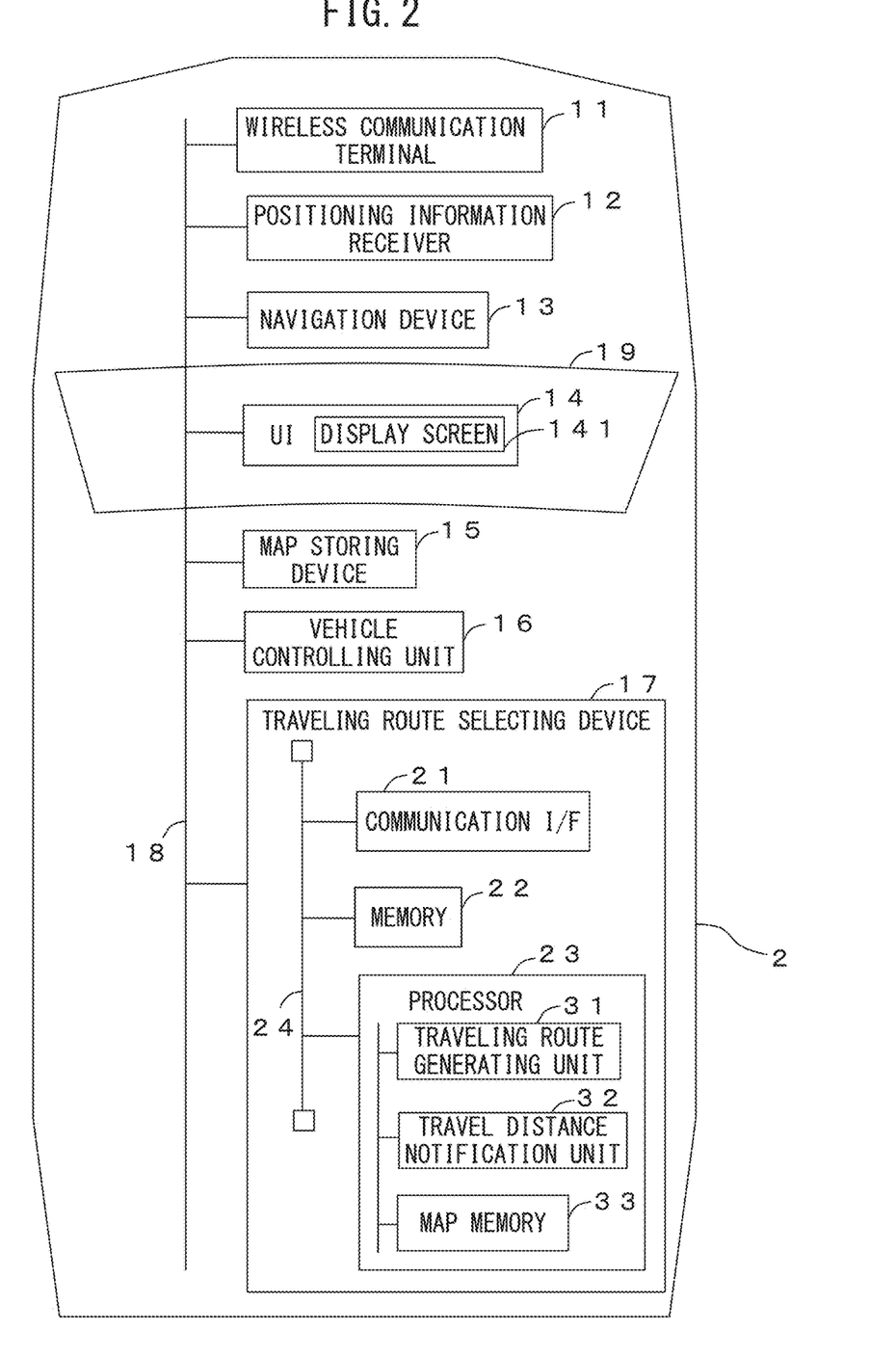
FIG. 2 is a general schematic drawing of a vehicle.

FIG. 2 is a general schematic drawing of the vehicle 2. The vehicle 2 has a wireless communication terminal 11, a positioning information receiver 12, a navigation device 13, a UI 14, a map storing device 15, a vehicle control device 16, a traveling route selecting device 17 and a front window 19. The vehicle 2 also has a camera (not shown) that acquires images of the environment surrounding the vehicle 2, in order to estimate the location of the vehicle 2 and detect other objects around the vehicle 2. The vehicle 2 may also have a LiDAR sensor, as a distance sensor (not shown) for measurement of the distance of the vehicle 2 to surrounding objects.

The wireless communication terminal 11, positioning information receiver 12, navigation device 13, UI 14, map storing device 15, vehicle control device 16 and traveling route selecting device 17 are connected in a communicable manner through an in-vehicle network 18 that conforms to controller area network standards.

The wireless communication terminal 11 is an example of a communication unit, being a device that carries out wireless communication processing conforming to a predetermined wireless communication standard, and for example, it accesses the base station 5 to connect with the server 3 through the base station 5 and communication network 4.

The positioning information receiver 12 outputs positioning information that represents the current location of the vehicle 2. The positioning information receiver 12 may be a GPS receiver, for example. The positioning information receiver 12 outputs positioning information and the positioning information acquisition time at which the positioning information has been acquired, to the navigation device 13 and vehicle control device 16, each time positioning information is acquired at a predetermined receiving cycle.

The navigation device 13, being controlled by the traveling route selecting device 17, produces a traveling route R from the current location of the vehicle 2 to the destination, based on the navigation map data, the destination of the vehicle 2 and the current location of the vehicle 2. The navigation device 13 uses an algorithm such as the Dijkstra method to produce a traveling route R from the current location to the destination, based on criteria such as distance priority, time priority, fee priority, open road priority or highway priority. The navigation device 13 uses positioning information output by the positioning information receiver 12 as the current location of the vehicle 2. Every time a traveling route R is produced, the navigation device 13 outputs the traveling route R to the traveling route selecting device 17 through the in-vehicle network 18.

The UI 14 is controlled by the traveling route selecting device 17 to notify the driver of traveling information for the vehicle 2, while producing an operation signal in response to operation by the driver. The traveling information of the vehicle 2 includes information relating to the current location of the vehicle 2 and the traveling route R. The UI 14 has a display screen 141 that displays an image. The UI 14 used may be, for example, a touch panel-equipped display device, comprising a touch panel mounted on a liquid crystal display device.

Each time the traveling route R is set, the map storing device 15 stores information relating to the relationship between the traveling route R and zone, and the map selected for each zone, as received from the server 3.

Based on information relating to other objects detected by an object detector (not shown), the vehicle control device 16 tracks and estimates the future trajectory of those other objects. Based on the traveling route R of the vehicle 2, information relating to the relationship between the traveling route R and zone stored in the map storing device 15, and to the map selected for each zone, the future trajectory of other objects as estimated by the vehicle control device 16, and the current location of the vehicle 2, the vehicle control device 16 produces a driving plan for the vehicle 2, maintaining a prescribed distance between the vehicle 2 and other objects. The vehicle control device 16 also produces a control signal based on the driving plan. The vehicle control device 16 sends the control signal via the in-vehicle network 18 to an actuator (not shown) that controls the steering wheel of the vehicle 2, a drive unit (not shown) such as the engine of the vehicle 2, or the brake (not shown). All or some of the functions of the vehicle control device 16 are functional modules driven by a computer program operating on the processor, for example. Alternatively, all or some of the functions of the vehicle control device 16 may be special computing circuits.

The traveling route selecting device 17 executes traveling route generating processing in which the traveling route R produced using the navigation device 13 is sent to the server 3. The traveling route selecting device 17 also executes travel distance notification processing in which it receives from the server 3 a travel distance for each control level for automatic control when the vehicle 2 is traveling on the traveling route R, and notifies the driver of the received information via the UI 14. The traveling route selecting device 17 also executes map storage processing in which it sends the server 3 information representing the traveling route R selected by the driver, receives from the server 3 the information relating to the relationship between the selected traveling route R and zone and to the map selected for each zone, and stores the received information in the map storing device 15. For this purpose, the traveling route selecting device 17 has a communication I/F 21, a memory 22 and a processor 23. The communication I/F 21, the memory 22 and the processor 23 are connected via a signal wire 24.

The communication interface (I/F) 21 is an example of an in-vehicle communication unit, and it has an interface circuit to connect the traveling route selecting device 17 with the in-vehicle network 18. In other words, the communication I/F 21 is connected with the wireless communication terminal 11, positioning information receiver 12, navigation device 13, UI 14, map storing device 15 and vehicle control device 16, through the in-vehicle network 18. Each time information representing the traveling route R from the processor 23 or the traveling route R selected by the driver is transferred, the communication I/F 21 sends the transferred information to the wireless communication terminal 11. Each time it receives from the wireless communication terminal 11 a travel distance for each control level for automatic control when the vehicle 2 is traveling according to the traveling route R, or a map to be used for traveling on the selected traveling route R, the communication I/F 21 outputs the received information to the processor 23.

The memory 22 is an example of a memory unit, and it has a volatile semiconductor memory and a non-volatile semiconductor memory, for example. The memory 22 stores an application computer program and data to be used for information processing carried out by the processor 23 of the traveling route selecting device 17, and a vehicle ID for identification of the vehicle 2. The vehicle ID can be used to identify each vehicle 2 when the server 3 communicates with more than one vehicle 2, for example.

The processor 23 comprises one or more CPUs (Central Processing Units) and their peripheral circuits. The processor 23 may also have other computing circuits such as a logical operation unit, numerical calculation unit or graphic processing unit. When the processor 23 has multiple CPUs, it may have a separate memory for each CPU.

The processor 23 has a traveling route generating unit 31 which carries out traveling route generating processing, a travel distance notification unit 32 which carries out travel distance notification processing, and a map memory unit 33 that carries out map storage processing. Each of the units of the processor 23 are functional modules driven by a computer program operating on the processor 23, for example. Alternatively, each of the units of the processor 23 may be specialized computing circuits in the processor 23.

Figure 3:
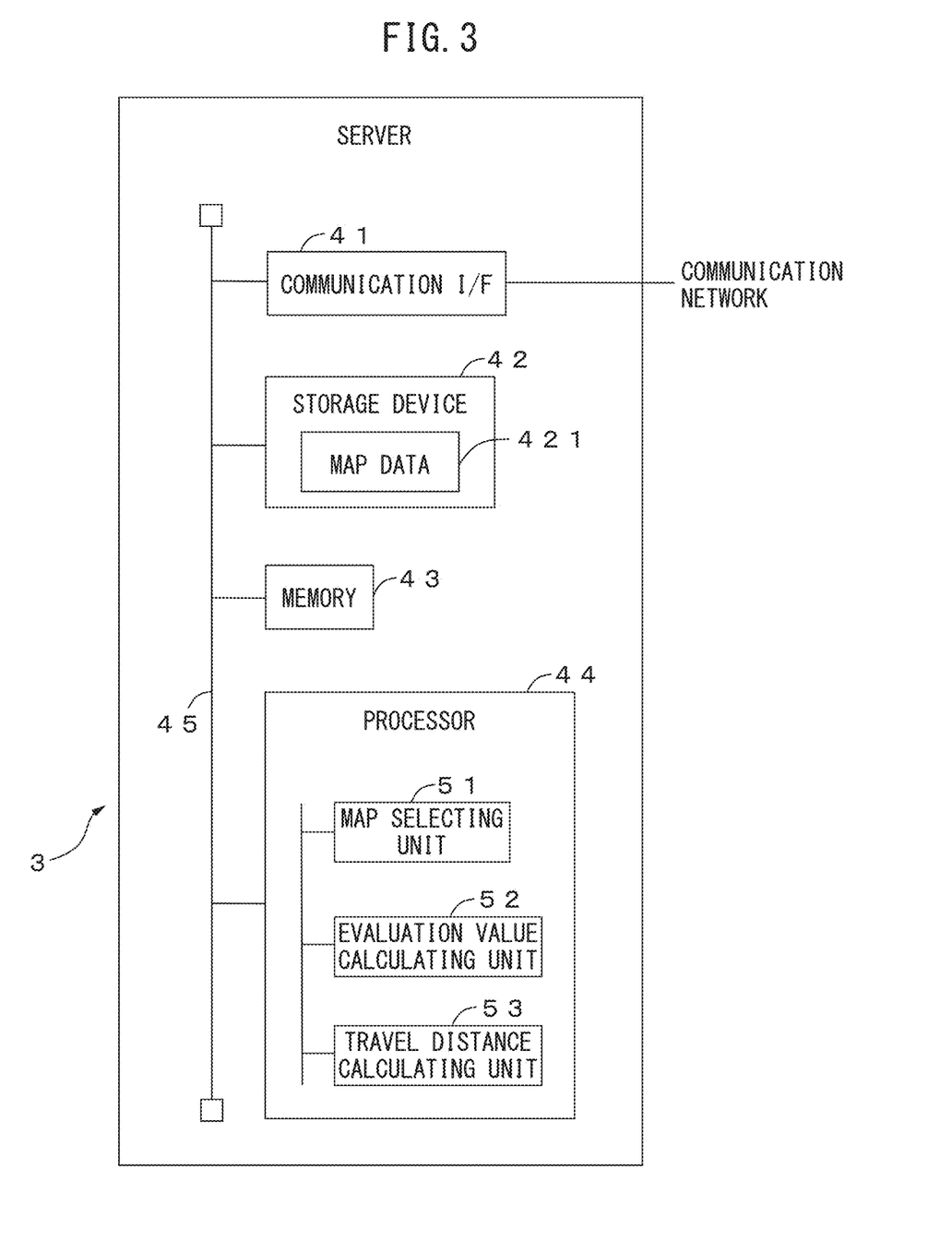
FIG. 3 is a hardware configuration diagram of a server.

FIG. 3 is a hardware configuration diagram of a server 3. The server 3 has a communication interface (I/F) 41, a storage device 42, a memory 43 and a processor 44. The communication I/F 41, storage device 42, memory 43 and processor 44 are connected via signal wires 45. The server 3 may also comprise an input device such as a keyboard and mouse, and a display device such as a liquid crystal display.

The communication I/F 41 is an example of acquisition unit, and it has an interface circuit to connect the server 3 with the communication network 4. The communication I/F 41 is configured in a communicable manner with the vehicle 2, communication network 4 and base station 5.

The storage device 42 is an example of a memory, and it has, for example, a hard disk device or optical recording medium, as a non-transitory storage medium, and a device for accessing it. The storage device 42 stores map data 421 including multiple maps to be used for traveling of the vehicle 2. The storage device 42 may additionally store the vehicle ID of the vehicle 2. The storage device 42 may still further store a computer program for carrying out processing by the server 3 related to map selection processing, which is carried out in the processor 44.

The map data 421 includes the multiple maps, the information representing the regions represented by each of the multiple maps, and the control level for automatic control that is compatible with each map. Each of the multiple maps contains the locations and types of the different road features (such as lane marking lines, stop lines, speed indicators and other road markings, road signs or traffic lights) represented in the map. Each of the multiple maps may also contain information related to traffic regulations, information related to accidents, information related to other vehicles or pedestrians, and information related to signals.

A control level for automatic control that is compatible with each map is set, based on the degree of precision for the locations of road features registered in each of the multiple maps, and the types and numbers of road features registered in the maps. The degree of precision for the locations of road features in each of the multiple maps affects the degree of precision for the location of the vehicle that will be estimated based on the road feature locations. The types of road features registered in the maps produce constraints for sensors that allow detection of those types of road features. Therefore, the types of road features registered in the maps affect the degree of precision for the location of the vehicle that will be estimated based on the road feature locations, in response to sensors mounted in the vehicle 2. Since the number of road features registered in a map produces a constraint on the frequency for estimating the location of the vehicle based on detected road features, it affects the degree of precision for the location of the vehicle to be estimated based on the locations of the road features.

The memory 43 is another example of a memory unit, and it has a non-volatile semiconductor memory and a volatile semiconductor memory, for example. The memory 43 transiently stores data generated during execution of the server 3-related processing among the map selection processing, and data acquired by communication with the vehicle 2, such as traveling routes received from the vehicle 2.

The processor 44 comprises one or more CPUs (Central Processing Units) and their peripheral circuits. The processor 44 may also have other computing circuits such as a logical operation unit or numerical calculation unit. The processor 44 carries out processing related to the server 3, among the map selection processing.

The processor 44 has a map selecting unit 51 that selects one or more maps containing the traveling route R, from among multiple maps stored in the storage device 42, so as to include the region from the current location on the traveling route R to the destination. The processor 44 has an evaluation value calculating unit 52 that calculates an evaluation value for each of the multiple map candidates containing the single zone included in the traveling route R, based on the control level for automatic control which allows traveling of the vehicle 2 using the map candidate, for evaluation of suitability for automatic control for each of the multiple map candidates. The processor 44 also has a travel distance calculating unit 53 that determines the length of the zone of the traveling route R contained in each of the one or more maps, for each control level for automatic control corresponding to the one or more maps selected by the map selecting unit 51, and calculates the distance that the vehicle 2 can travel with each of multiple control levels when it is traveling on the traveling route R. Each of the units of the processor 44 are functional modules driven by a computer program operating on the processor 44, for example. Alternatively, each of the units of the processor 44 may be specialized computing circuits in the processor 44.

Figure 4:
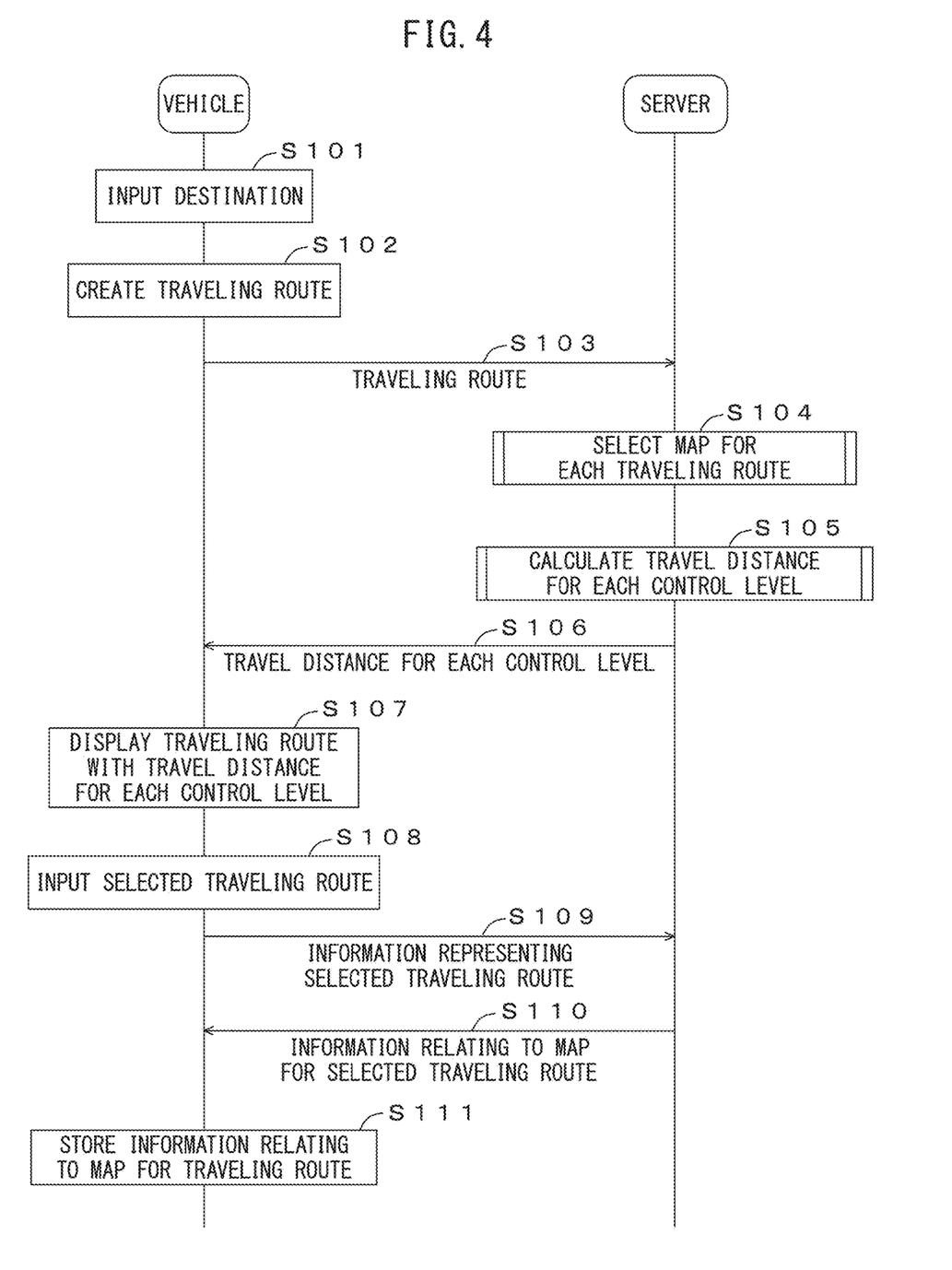
FIG. 4 is a sequence diagram for map selection processing.

FIG. 4 is a sequence diagram for map selection processing. In the map selecting system 1, map selection is repeated according to the sequence diagram shown in FIG. 4, each time a traveling route R is generated for the vehicle 2.

The traveling route generating unit 31 of the processor 23 in the traveling route selecting device 17 of the vehicle 2 inputs the destination for the vehicle 2 by the driver via the UI 14 (step S101). This process is usually carried out when the traveling route R is set, before the vehicle 2 has begun to travel.

The traveling route generating unit 31 outputs the destination for the vehicle 2 input from the UI 14, to the navigation device 13, and for the navigation device 13, using multiple criteria, it generates a traveling route R from the current location to the destination based on each of the criteria (step S102). The multiple criteria may be distance priority, time priority, fee priority, open road priority and highway priority. The traveling route generating unit 31 may generate a traveling route R according to one or more criteria from among distance priority, time priority, fee priority, open road priority and highway priority.

The traveling route generating unit 31 outputs multiple traveling routes R generated by the navigation device 13 to the wireless communication terminal 11 via the communication I/F 21, thereby sending the multiple traveling routes R to the server 3 through the base station 5 and communication network 4 (step S103). The processor 44 of the server 3 then receives the multiple traveling routes R via the communication I/F 41.

The map selecting unit 51 of the processor 44 of the server 3 selects one or more maps containing the traveling route R from among multiple maps stored in the storage device 42, so as to include the region from the current location on the traveling route R to the destination, for each of the multiple traveling routes R (step S104). When multiple map candidates exist containing a single zone included in the traveling route R, the map selecting unit 51 selects the map candidate suitable for automatic control as the map to be utilized for traveling in the zone. The map selecting unit 51 then sends to the travel distance calculating unit 53 the information relating to the relationship between the traveling route R and zones, and relating to the map selected for each zone. The details regarding map selection processing by the map selecting unit 51 will be explained below with reference to FIG. 6 and FIG. 7.

For each of the multiple traveling routes R, the travel distance calculating unit 53 of the processor 44 at the server 3 determines the length of the zone of the traveling route R contained in each of the one or more maps, for each control level for automatic control corresponding to the one or more maps selected by the map selecting unit 51. The travel distance calculating unit 53 also calculates the distance that the vehicle 2 can travel with each of multiple control levels when it is traveling on the traveling route R (step S105). The details regarding travel distance calculation processing by the travel distance calculating unit 53 will be described below with reference to FIG. 8.

For each of the multiple traveling routes, the travel distance calculating unit 53 sends to the vehicle 2 the distance that the vehicle 2 can travel with each of multiple control levels when it is traveling on the traveling route R, through the communication I/F 41, by way of the communication network 4 and base station 5 (step S106). The wireless communication terminal 11 of the vehicle 2 receives the distance that the vehicle 2 can travel with each of multiple control levels when it is traveling on the traveling route R, for each of the multiple traveling routes, and outputs this information to the traveling route selecting device 17.

The travel distance notification unit 32 of the processor 23 in the traveling route selecting device 17 notifies the driver of the distance that the vehicle 2 can travel with each of multiple control levels when it is traveling on the traveling route R, for each of the multiple traveling routes, through the UI 14 (step S107).

Figure 5:
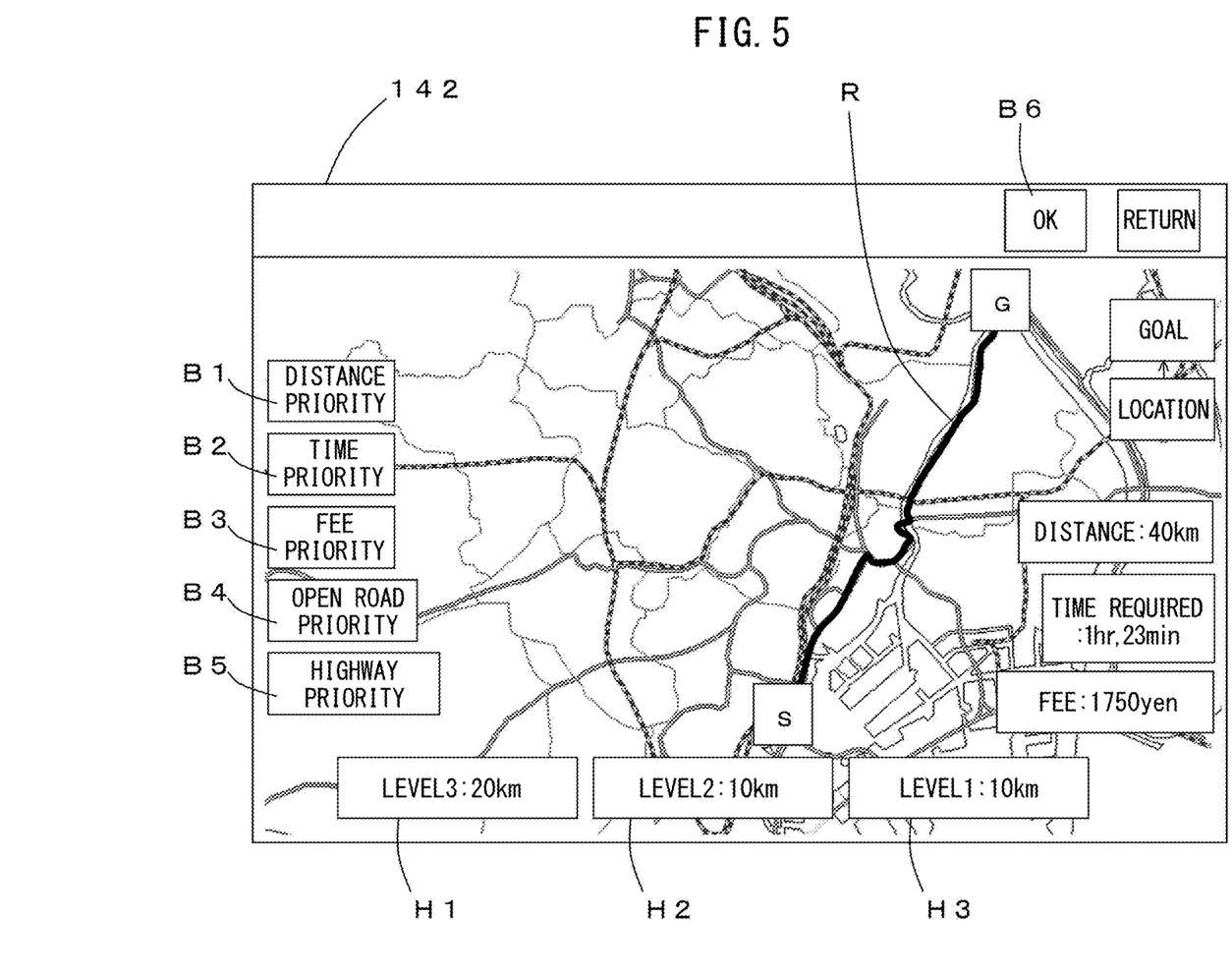
FIG. 5 is a diagram showing an image displayed on a display screen of a user interface.

FIG. 5 is a diagram showing an image 142 displayed on the display screen 141 of the UI 14. A navigation map containing the traveling route R from the current location S of the vehicle 2 to the destination G is displayed in the image 142 that is displayed on the UI 14. Also displayed in the image 142 are a distance priority button B1, a time priority button B2, a fee priority button B3, an open road priority button B4 and a highway priority button B5, for selection of the criteria by which the traveling route R was generated. The traveling route R generated based on the criterion selected by the driver is displayed in the image 142. In the image 142 there are also displayed distances H1, H2, H3 that can be traveled with each of the multiple control levels when the vehicle 2 is traveling on the traveling route R. In the image 142 there are additionally displayed the distance, time required and fee for when the vehicle 2 will travel on the traveling route R. Each time one from among the distance priority button B1 to the highway priority button B5 is operated by the driver, the travel distance notification unit 32 displays on the display screen 141 an image 142 containing the traveling route R corresponding to the pressed button and the distance, etc. that can be traveled with each of the multiple control levels. FIG. 5 shows an example of an image displayed by the UI 142, with other maps being displayable depending on the traveling route.

The travel distance notification unit 32 inputs the traveling route R selected by the driver through the UI 14 (step S108). When the driver presses the OK button B6, the travel distance notification unit 32 assesses that the traveling route R displayed on the UI 14 has been selected by the driver.

The travel distance notification unit 32 outputs information representing the selected traveling route R to the wireless communication terminal 11 via the communication I/F 21, thereby sending the information representing the selected traveling route R to the server 3 through the base station 5 and communication network 4 (step S109). The communication I/F 41 of the server 3 then receives the information representing the selected traveling route R. The communication I/F 41 outputs the information representing the selected traveling route R to the processor 44.

Based on the information representing the traveling route R that has been transferred from the communication I/F 41, the map selecting unit 51 of the processor 44 in the server 3 sends the vehicle 2 information relating to the relationship between the traveling route R selected by the driver and the zone, and to the one or multiple maps selected for each zone, through the communication I/F 41 by way of the communication network 4 and base station 5 (step S110). The wireless communication terminal 11 of the vehicle 2 receives this information and outputs it to the traveling route selecting device 17.

The map memory unit 33 of the processor 23 in the traveling route selecting device 17 of the vehicle 2 causes storing in the map storing device 15 of the information relating to the relationship between the traveling route R and zones input from the wireless communication terminal 11, and to the one or multiple maps selected for each zone (step S111). The vehicle control device 16 of the vehicle 2 then controls traveling of the vehicle 2 in each zone of the traveling route R, at the control level for automatic control which allows travel of the vehicle 2, based on the information relating to the relationship between the traveling route R and zones and to the one or multiple maps selected for each zone, which are stored in the map storing device 15. In the example shown in FIG. 7, for example, the vehicle control device 16 controls traveling of the vehicle 2 at control level 2 in zone D1 of the traveling route R, controls traveling of the vehicle 2 at control level 3 in zones D2 and D3 of the traveling route R, and controls traveling of the vehicle 2 at control level 1 in zone D4 of the traveling route R.

Figure 6:
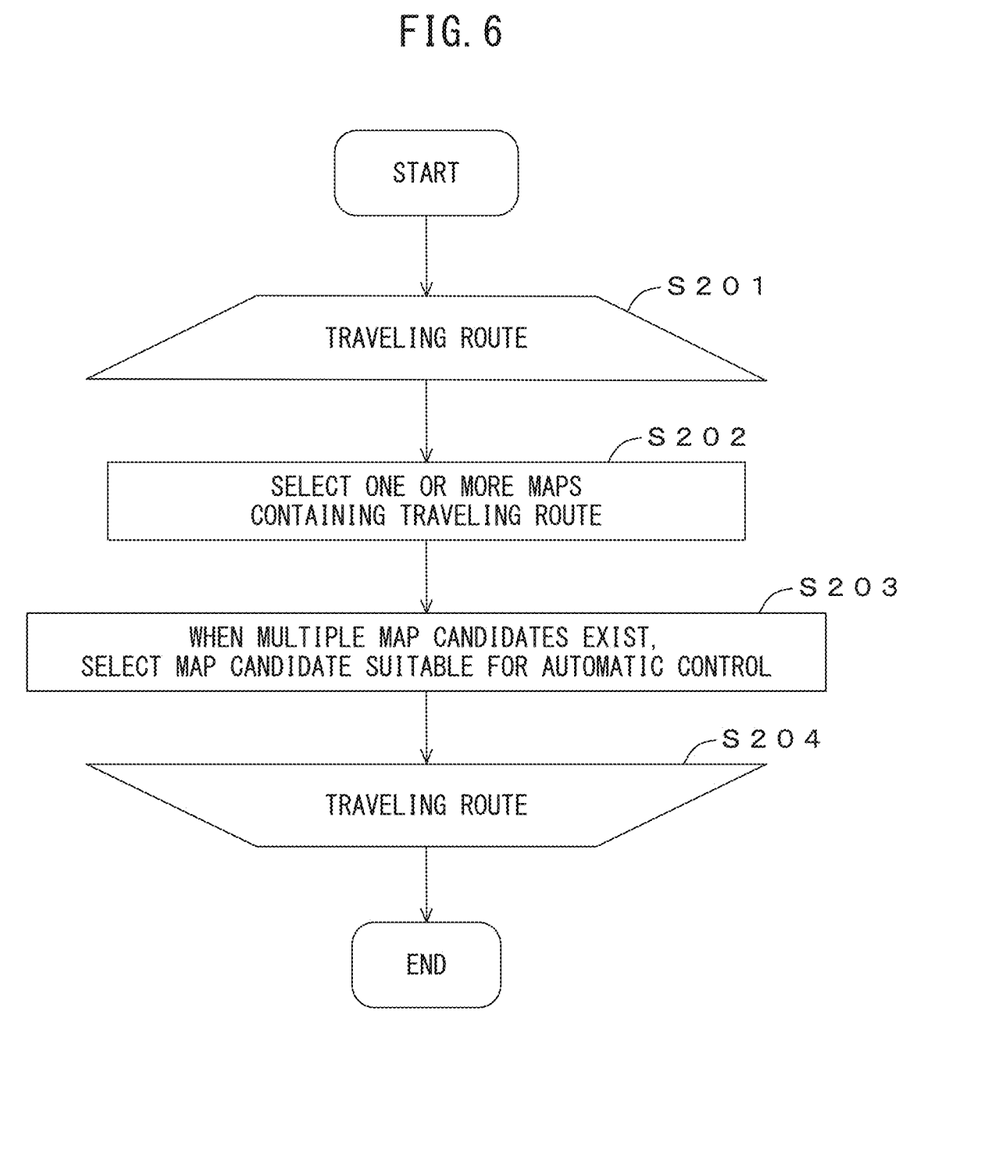
FIG. 6 is an operation flow chart for a map selecting unit in a processor of a server.

FIG. 6 is an operation flow chart for a map selecting unit 51 in a processor 44 of a server 3. Map selection processing by the map selecting unit 51 in step S104 will now be explained with reference to the operation flow chart of FIG. 6.

The map selecting unit 51 carries out loop processing from step S202 to step S203 for each of the multiple traveling routes R according to the criteria of distance priority, time priority, fee priority, open road priority and highway priority (step S201 to step S204).

The map selecting unit 51 selects one or more maps containing the traveling route R from among multiple maps stored in the storage device 42, based on the information representing each of the regions shown in the multiple maps, so as to include the region from the current location on the traveling route R to the destination (step S202).

Figure 7:
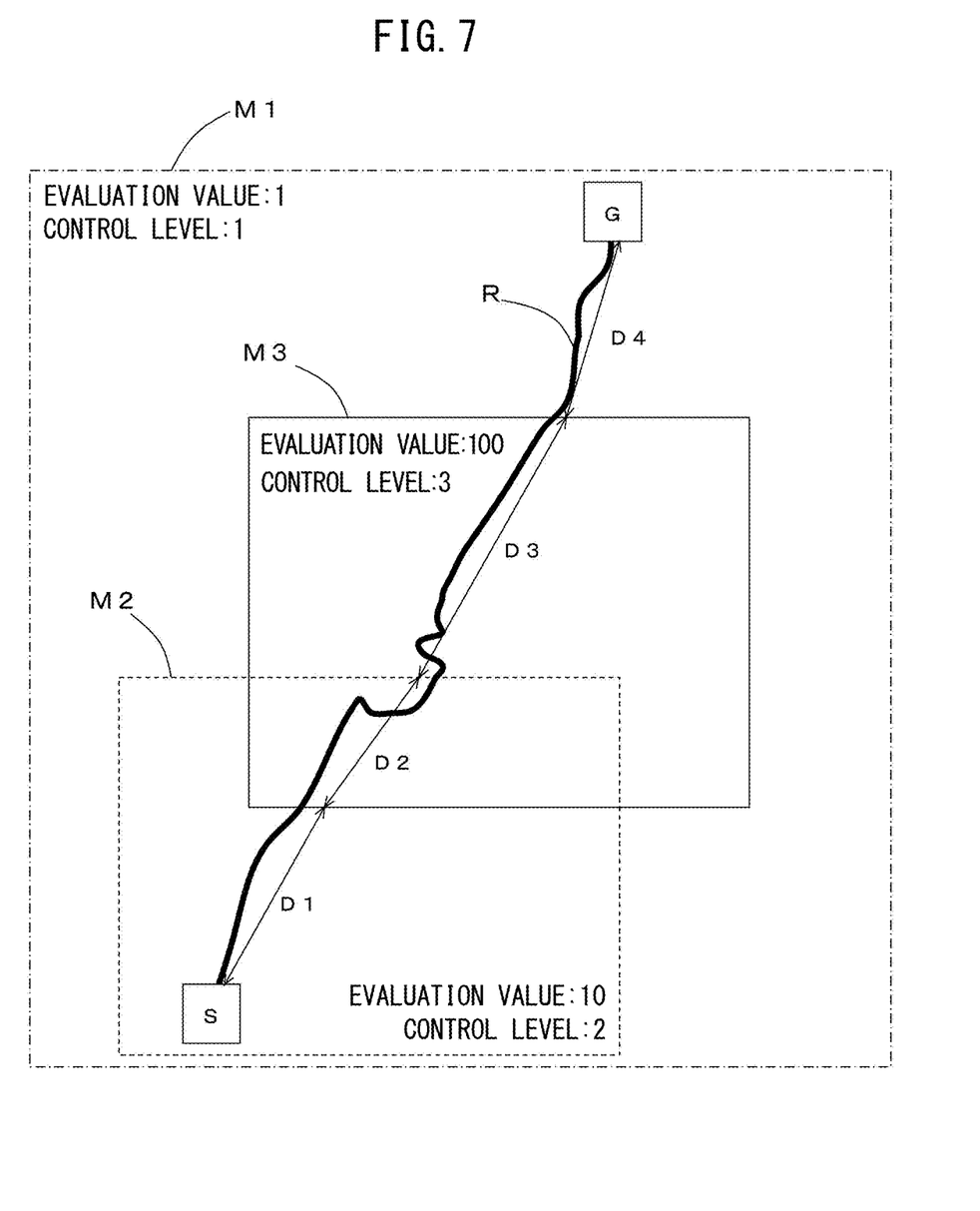
FIG. 7 is a diagram illustrating operation of the map selecting unit.

FIG. 7 is a diagram illustrating operation of the map selecting unit 51. In the example shown in FIG. 7, map M1, map M2 and map M3 are selected for traveling route R. Map M1 corresponds to automatic control level 1, map M2 corresponds to automatic control level 2 and map M3 corresponds to automatic control level 3.

Zone D1 of the traveling route R is contained in map M1 and map M2. Zone D2 of the traveling route R is contained in map M1, map M2 and map M3. Zone D3 of the traveling route R is contained in map M2 and map M3. Zone D4 of the traveling route R is contained only in map M1.

Each of the multiple maps that contain an identical zone of the traveling route R are map candidates for being selected as a single map from among the multiple maps for the zone. Map M1 and map M2 are map candidates for zone D1 of the traveling route R. Map M1, map M2 and map M3 are map candidates for zone D2 of the traveling route R. Map M2 and map M3 are map candidates for zone D3 of the traveling route R.

When multiple map candidates exist containing a single zone included in the traveling route R, the map selecting unit 51 selects a map candidate suitable for automatic control as the map to be utilized for traveling in the zone (step S203). Specifically, the map selecting unit 51 selects the map to be utilized for traveling in the zone based on evaluation values for evaluation of the suitability of each of the multiple map candidates for automatic control. The map selecting unit 51 selects the map candidate with the highest evaluation value as the map to be utilized for traveling in the zone.

In the example shown in FIG. 7, the evaluation value for map M1 is 1, the evaluation value for map M2 is 10 and the evaluation value for map M3 is 100. For zone D1, the map selecting unit 51 selects map M2, as the map candidate with the highest evaluation value, for zone D2, it selects map M3 as the map candidate with the highest evaluation value, and for zone D3 it selects map M3 as the map candidate with the highest evaluation value. For zone D4 which is contained only in map M1, map M1 is already selected by the map selecting unit 51 in step S202 described above.

The map selecting unit 51 thus selects maps so that the maps with the highest evaluation values for evaluation of suitability for automatic control have maximum lengths for the zones within the traveling route R.

The following explanation is for processing whereby the evaluation value calculating unit 52 of the processor 44 of the server 3 calculates the evaluation value for a map that has been selected as a map candidate. The evaluation value calculating unit 52 calculates an evaluation value for each of the multiple map candidates based on a feature descriptor that includes the control level for automatic control which allows travel of the vehicle 2 using the map candidate. If the hardware of the vehicle 2 uses a map corresponding to a control level at or above the control level for automatic control which allows travel, then the vehicle 2 will be able to travel at a control level which allows travel of the vehicle 2 by the hardware. For example, if the vehicle has hardware that allows traveling at control level 3, then traveling at control level 3 will be possible by using a map corresponding to a control level of 3 or higher. Thus, the control level for automatic control which allows travel of the vehicle 2 using a map candidate is the maximum control level at which travel is possible with the hardware of the vehicle 2, either at or below the control level for automatic control to which the map corresponds. The evaluation value calculating unit 52 calculates the evaluation value based on the control level for automatic control, together with map feature descriptors such as map up-to-dateness information (the length of the period between the current time and the date and time at which the map was created), vendor reliability information representing the reliability of the vendor who created the map, position accuracy information representing the precision of the location of road features registered in the map, the number of transfer requests in which transfer of control of the vehicle 2 from automatic control to manual control has been requested by the driver in the past, using the vehicle control device 16 while the vehicle 2 is traveling under automatic control using the map (override request), and the number of updates in which information in the map has been updated. Each time an override request is created for the vehicle 2, the evaluation value calculating unit 52 receives from the vehicle 2 the information representing the map used at the time of the override request, incrementing the number of transfer requests related to that map, and storing the updated transfer number in the storage device 42 with a reference to the map.

The evaluation value calculating unit 52 calculates the evaluation value Y for the map using the following formula (1).

$$Y = W \cdot X \quad (1)$$

In the formula, X represents a vector whose components are the map feature descriptors such as the control level, a numerical value representing up-to-dateness information, a numerical value representing vendor reliability information, a numerical value representing position accuracy information, the number of transfer requests and the number of updates, and W represents the vector whose components are the weights of each of the map feature descriptors. W·X represents the scalar product of vector W and vector Y. The weights of the map feature descriptors are determined using multivariate analysis, for example.

The map feature descriptors and their weights are recorded in the storage device 42 in association with the maps, and the evaluation value calculating unit 52 reads the information out from the storage device 42 each time a map evaluation value is to be calculated for a map candidate. For the map up-to-dateness information, the creation date and time at which the map was created are stored in the storage device 42, and the evaluation value calculating unit 52 reads out the creation date and time at which the map was created from the storage device 42 and determines the length of the period between the current time and the creation date and time at which the map was created, calculating a numerical value representing the up-to-dateness information. This completes explanation of processing by the evaluation value calculating unit 52 for calculation of the evaluation value.

The map selecting unit 51 carries out loop processing from step S202 to step S203 for each of multiple traveling routes R. This completes explanation of map selection processing by the map selecting unit 51 in step S104.

Figure 8:
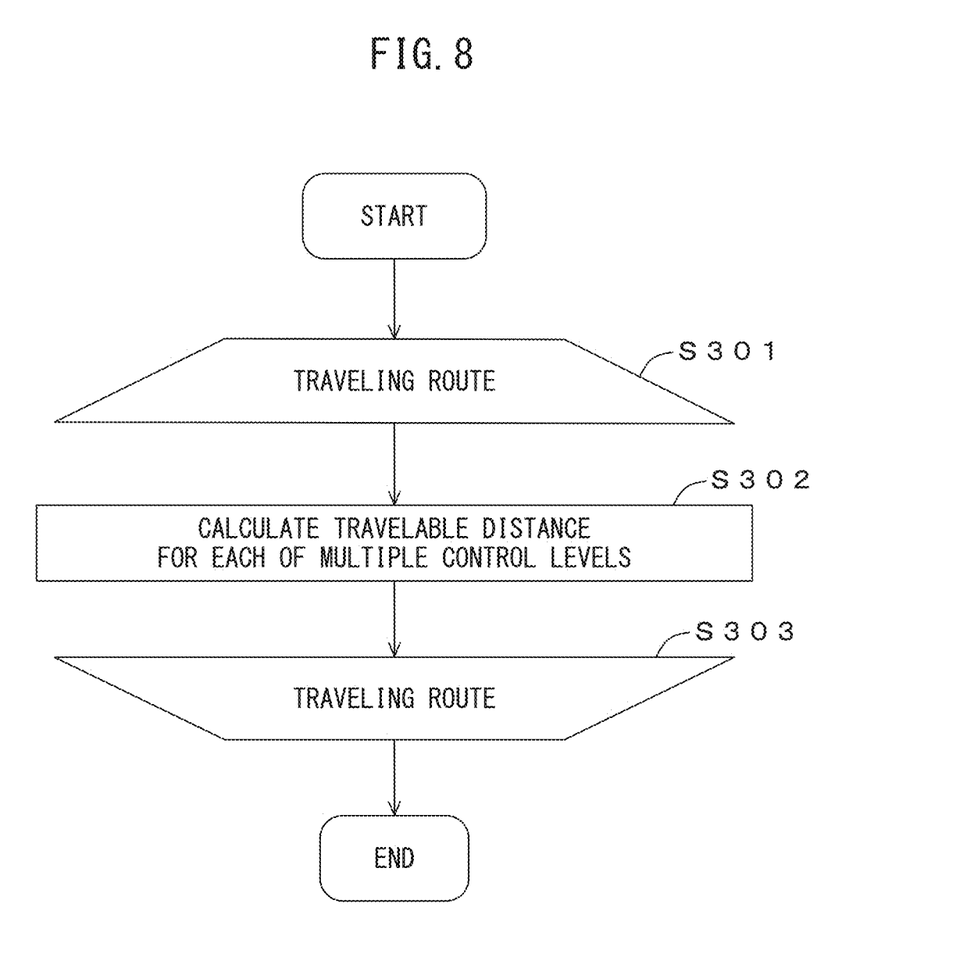
FIG. 8 is an operation flow chart for a travel distance calculating unit in a processor of a server.

FIG. 8 is an operation flow chart for a travel distance calculating unit 53 in a processor 44 of a server 3. Travel distance calculation processing by the travel distance calculating unit 53 in step S105 will now be explained with reference to the operation flow chart of FIG. 8.

The travel distance calculating unit 53 carries out the loop processing of step S302 for each of the multiple traveling routes R according to the criteria of distance priority, time priority, fee priority, open road priority and highway priority (step S301 to step S303).

For each of the multiple traveling routes R to be loop-processed, the travel distance calculating unit 53 determines the length of the zone of the traveling route R contained in each of the one or more maps, for each control level for automatic control corresponding to the one or more maps selected by the map selecting unit 51. The travel distance calculating unit 53 also calculates the distance that the vehicle 2 can travel with each of multiple control levels when it is traveling on the traveling route R (step S302).

In the example shown in FIG. 7, map M2 corresponding to control level 2 is selected by the map selecting unit 51 for zone D1 of the traveling route R, while map M3 corresponding to control level 3 is selected for zones D2 and D3 of the traveling route R. Map M1 corresponding to control level 1 is also selected by the map selecting unit 51 for zone D3 of the traveling route R.

The travel distance calculating unit 53 determines the length of zone D4 contained in map M1 corresponding to control level 1, and calculates the distance that can be traveled by the vehicle 2 at control level 1 while it is traveling on the traveling route R. In addition, the travel distance calculating unit 53 determines the length of zone D1 contained in map M2 corresponding to control level 2, and calculates the distance that can be traveled by the vehicle 2 at control level 2 while it is traveling on the traveling route R. The travel distance calculating unit 53 also determines the total length for the length of zone D2 and the length of zone D3 contained in map M3 corresponding to control level 3, and calculates the distance that can be traveled by the vehicle 2 at control level 3 while it is traveling on the traveling route R.

The travel distance calculating unit 53 carries out the loop processing of step S302 for each of multiple traveling routes R. This completes explanation of travel distance calculation processing by the travel distance calculating unit 53 in step S105.

As explained above, the map selection device acquires the traveling route from the current location of the vehicle to the destination through the acquiring unit. The map selection device selects one or more maps containing the traveling route, from among multiple maps stored in the memory, so as to include the region from the current location on the traveling route to the destination. When multiple map candidates exist containing a single zone included in the traveling route, the map selection device selects a map candidate suitable for automatic control as the map to be utilized for traveling in the zone. This allows the map selection device to select a map so as to reduce the burden on the driver while the vehicle is traveling under automatic control, in cases where multiple maps exist containing a single zone within a traveling route, thereby allowing the burden on the driver to be reduced. The map selection device also determines the length of the zone of the traveling route contained in each of the one or more maps, for each control level for automatic control corresponding to the one or more selected maps, and calculates the distance that the vehicle can travel with each of multiple control levels when it is traveling on the traveling route. Thus, the map selection device can notify the driver of the distance that the vehicle can travel with each of multiple control levels when it is traveling on the traveling route, so that the driver can concretely ascertain the degree of burden.

The map selection device, computer program for map selection and map selection method according to the embodiment of the invention described above may incorporate appropriate modifications that are still within the gist of the invention. Moreover, the technical scope of the invention is not limited to this embodiment, and includes the invention and its equivalents as laid out in the Claims.

For example, the server of this embodiment had the function of the map selection device, but the map selection device may instead be disposed in the vehicle.

Also, the method used for this embodiment in which the evaluation value calculating unit calculates the evaluation value is merely an example, and there is no limitation to this method. For example, the evaluation value calculating unit may calculate the evaluation value based on only the control level for automatic control. The evaluation value calculating unit may also calculate the evaluation value based on map feature descriptors other than those mentioned above, in addition to the control level for automatic control. The evaluation value calculating unit may also calculate the evaluation value based on some of the descriptors among the multiple map feature descriptors, in addition to the control level for automatic control.

The map selecting unit for the embodiment described above selects one or more maps containing the traveling route from among multiple maps stored in the storage device, so as to include the region from the current location on the traveling route to the destination, for each of the multiple traveling routes. In the case of a traveling route with a long total traveling distance, such as when the current location is Tokyo and the destination is Osaka, multiple maps for the Kanto region, multiple maps for the Tokai region and multiple maps for the Kansai region may be received and stored in the map storing device of the vehicle, as the vehicle is moving. This is because of the large memory size of the map, which does not allow the entire map to be stored in the map storing device of the vehicle. In such cases, before the vehicle begins to travel, the map selecting unit selects one or more maps containing the traveling route from among the multiple maps for the Kanto region stored in the storage device, so that it includes the region from the current location on the traveling route in the Kanto region up to a point at the boundary between the Kanto region and Tokai region. Also, before the vehicle begins travel in the Tokai region, the map selecting unit selects one or more maps containing the traveling route from among the multiple maps for the Tokai region stored in the storage device, so that it includes the region from the point at the boundary between the Kanto region and Tokai region on the traveling route up to a point at the boundary between the Tokai region and Kansai region. In addition, before the vehicle begins travel in the Kansai region, the map selecting unit selects one or more maps containing the traveling route from among the multiple maps for the Kansai region stored in the storage device, so that it includes the region from the point at the boundary between the Tokai region and Kansai region on the traveling route up to the destination in the Kanto region. This processing by the map selecting unit also includes repeated selection of one or more maps containing the traveling route while the vehicle is moving.

The invention claimed is:

1. A map selection device comprising:
an acquisition device that acquires a traveling route from the current location of a self-driving vehicle to a destination;
a storage device that stores multiple maps; and
a processor configured to
select a plurality of map candidates for a first zone included in the traveling route from among the multiple maps stored in the storage device,
calculate an evaluation value for each of the map candidates based on a maximum control level for automatic control at which travel is possible for hardware of the self-driving vehicle using the map candidate, and
select, from among the map candidates, a first map candidate having the highest evaluation value for the first zone, wherein
the evaluation value is calculated based on (i) the hardware of the self-driving vehicle and (ii) the length of period between the current time and the time at which each map candidate was created.

2. The map selection device according to claim 1, wherein the processor is further configured to determine the length of the first zone of the traveling route contained in each of the map candidates, for each control level for automatic control corresponding to the selected map candidates, and to calculate a distance that the self-driving vehicle can travel with each of multiple control levels when the self-driving vehicle is traveling on the traveling route.

3. A computer-readable non-transitory storage medium that stores a computer program for map selection, which causes a processor:
to input a traveling route from the current location of a self-driving vehicle to a destination via an acquisition device;
to select a plurality of map candidates for a first zone included in the traveling route from among multiple maps stored in a storage device;
to calculate an evaluation value for each of the map candidates based on a maximum control level for automatic control at which travel is possible for hardware of the self-driving vehicle using the map candidate; and
to select, from among the map candidates, a first map candidate having the highest evaluation value for the first zone, wherein
the evaluation value is calculated based on (i) the hardware of the self-driving vehicle and (ii) the length of period between the current time and the time at which each map candidate was created.

4. A map selection method, which causes a processor:
to input a traveling route from the current location of a self-driving vehicle to a destination via an acquisition device;
to select a plurality of map candidates for a first zone included in the traveling route from among multiple maps stored in a storage device;
to calculate an evaluation value for each of the map candidates based on a maximum control level for automatic control at which travel is possible for hardware of the self-driving vehicle using the map candidate; and to select, from among the map candidates, a first map candidate having the highest evaluation value for the first zone, wherein the evaluation value is calculated based on (i) the hardware of the self-driving vehicle and (ii) the length of period between the current time and the time at which each map candidate was created.

\* \* \* \* \*